(12) United States Patent
Obane

(10) Patent No.: US 10,305,422 B2
(45) Date of Patent: May 28, 2019

(54) SOLAR CELL MODULE AND SOLAR CELL MODULE MANUFACTURING METHOD

(71) Applicant: MITSUBISHI ELECTRIC CORPORATION, Chiyoda-ku, Tokyo (JP)

(72) Inventor: Hideaki Obane, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/560,326

(22) PCT Filed: May 13, 2015

(86) PCT No.: PCT/JP2015/063774

§ 371 (c)(1),
(2) Date: Sep. 21, 2017

(87) PCT Pub. No.: WO2016/181525

PCT Pub. Date: Nov. 17, 2016

(65) Prior Publication Data

US 2018/0062574 A1    Mar. 1, 2018

(51) Int. Cl.
*H02S 40/34* (2014.01)
*H02S 40/36* (2014.01)
*H01R 43/02* (2006.01)

(52) U.S. Cl.
CPC ......... *H02S 40/34* (2014.12); *H01R 43/0263* (2013.01); *H02S 40/36* (2014.12)

(58) Field of Classification Search
CPC ...... H02S 40/34; H02S 40/36; H01R 43/0263
(Continued)

(56) References Cited

U.S. PATENT DOCUMENTS 7,955,118 B2    6/2011    Ishida et al.
2010/0170716 A1*    7/2010    Ishida ............... H01R 4/4818
                                              174/84 R
(Continued)

FOREIGN PATENT DOCUMENTS

JP    WO 2013/073608    *    5/2013
WO    WO 2009/081508 A1    7/2009
(Continued)

OTHER PUBLICATIONS

International Search Report (PCT/ISA/210) dated Jul. 21, 2015, by the Japanese Patent Office as the International Searching Authority for International Application No. PCT/JP2015/063774.
(Continued)

*Primary Examiner* — Jayne L Mershon
(74) *Attorney, Agent, or Firm* — Buchanan Ingersoll & Rooney PC

(57) ABSTRACT

A solar cell module including a solar cell panel, an output lead wire led from the solar cell panel, a module coupling cable to transmit an electrical output of the solar cell panel to an outside, a terminal box, and a terminal cable, the output lead wire and the module coupling cable being connected to the terminal plate in the terminal box, wherein the terminal box has a lead-wire lead-in port through which output lead wires are led into the terminal box, the lead-wire lead-in port having an inclined portion at an edge thereof, the inclined portion having an inclination relative to a bottom surface portion of the terminal box, and the output lead wire is led into the terminal box along the inclined portion.

4 Claims, 3 Drawing Sheets

(58) Field of Classification Search
USPC .......................................................... 136/244
See application file for complete search history.

(56) References Cited

U.S. PATENT DOCUMENTS

2012/0012162 A1    1/2012  Kobayashi
2013/0019923 A1*   1/2013  Yamashita ........ H01L 31/02013
                                                          136/246

FOREIGN PATENT DOCUMENTS

WO    WO 2010/122856 A1    10/2010
WO    WO 2011/132748 A1    10/2011
WO    WO 2013/073608 A1     5/2013

OTHER PUBLICATIONS

Written Opinion (PCT/ISA/237) dated Jul. 21, 2015, by the Japanese Patent Office as the International Searching Authority for International Application No. PCT/JP2015/063774.

* cited by examiner

SOLAR CELL MODULE AND SOLAR CELL MODULE MANUFACTURING METHOD

FIELD

The present invention relates to a solar cell module including an output lead wire for electrical connection to a solar cell box, and a solar cell module manufacturing method.

BACKGROUND

In a general solar cell module, an output lead wire of a solar cell panel and a terminal plate in a terminal box are soldered or securely sandwiched using resin components to electrically connect the terminal box to the solar cell array having a plurality of solar cells arranged therein.

In general, a solar cell module has a plurality of sealed strings having solar cells connected in series, and output lead wires led from the strings into the terminal box. The terminal box includes a plurality of terminal plates and bypass diodes spanning a space between the respective terminal plates. Each of the terminal plates has one end connected to the output lead wire led from the string and the other end connected to a module coupling cable. The output lead wire is formed of a conductive material and has one end connected to an electrode of the string and the other end connected to the terminal plate of the terminal box. In some case, the inside of the terminal box is filled with a potting material that is an insulating material to keep the insulation property.

Connections between the output lead wires and the terminal plates are locations where the entire current generated by relevant solar cells flows. If the output lead wire and the terminal plate are separated from each other due to the poor adhesion at the connection therebetween, an electrical resistance is generated at the connection between the output lead wire and the terminal plate, and the terminal box may be damaged due to abnormal heat generation. The connection between the output lead wire and the terminal plate may be subjected to various stresses such as an internal stress for a long term. Accordingly, the electrical connection portion between the output lead wire and the terminal plate needs to closely adhere together at the electrical connection so as not to prevent the separation.

To improve the reliability of the electrical connection between the output lead wire and the terminal plate and prevent the occurrence of abnormal heat generation due to the separation at the connection, Patent Literature 1 discloses a method of bending the output lead wire led from the string, in a direction from an upper side of a hole of the terminal plate to a lower side of the hole, and subsequently soldering the output lead wire to the terminal plate to achieve the electrical connection therebetween.

CITATION LIST

Patent Literature

Patent Literature 1: International Publication No. WO2009/081508

SUMMARY

Technical Problem

For the invention disclosed in Patent Literature 1, depending on the manner of passing the output lead wire through the terminal plate, the output lead wire may be bent and hence fail to maintain the angle and shape of the output lead wire in an aimed condition.

The present invention has been achieved in view of the above, and an object of the present invention is to provide a solar cell module that maintains the angle and shape of an output lead wire in an aimed condition in connecting the output lead wire to the terminal plate in the terminal box, thereby improving the long-term reliability.

Solution to Problem

In order to solve the above problem and achieve the object, the present invention provides a solar cell module comprising a solar cell panel, an output lead wire led from the solar cell panel, a module coupling cable to transmit an electrical output of the solar cell panel to an outside, a terminal box, and a terminal plate, the output lead wire and the module coupling cable being connected to the terminal plate in the terminal box. The terminal box has a lead-wire lead-in port through which the output lead wire is led into the terminal box, the lead-wire lead-in port having an inclined portion at an edge thereof, the inclined portion having an inclination relative to a bottom surface portion of the terminal box. The output lead wire is led into the terminal box along the inclined portion.

Advantageous Effects of Invention

The solar cell module according to the present invention provides an effect of maintaining the angle and shape of the output lead wire in the aimed condition in connecting the output lead wire to the terminal plate in the terminal box, thereby improving the long-term reliability.

DESCRIPTION OF EMBODIMENT

A solar cell module and a solar cell module manufacturing method according to an embodiment of the present invention will be described in detail below with reference to the accompanying drawings. The present invention is not limited to the embodiment.

Embodiment.

Figure 1:
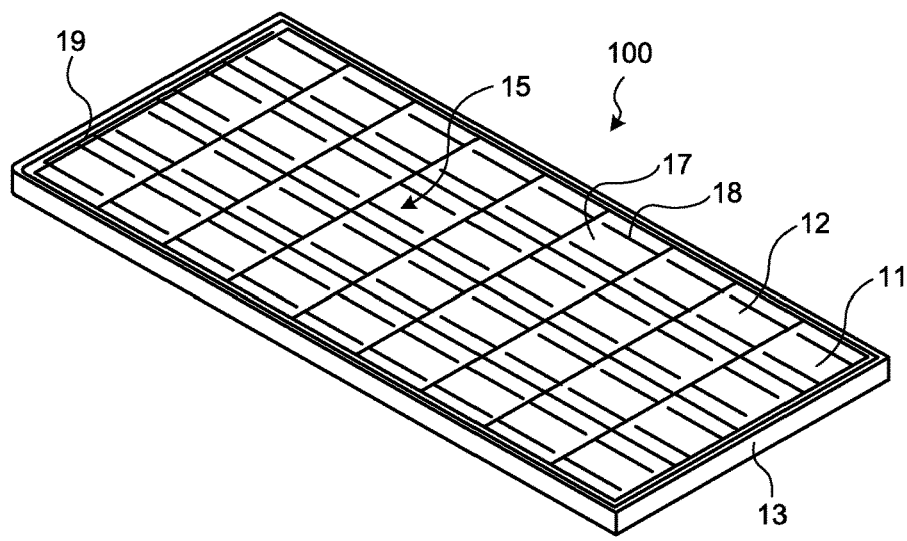
FIG. 1 is a perspective view of a light-receiving surface side of a solar cell module according to an embodiment of the present invention.
Figure 2:
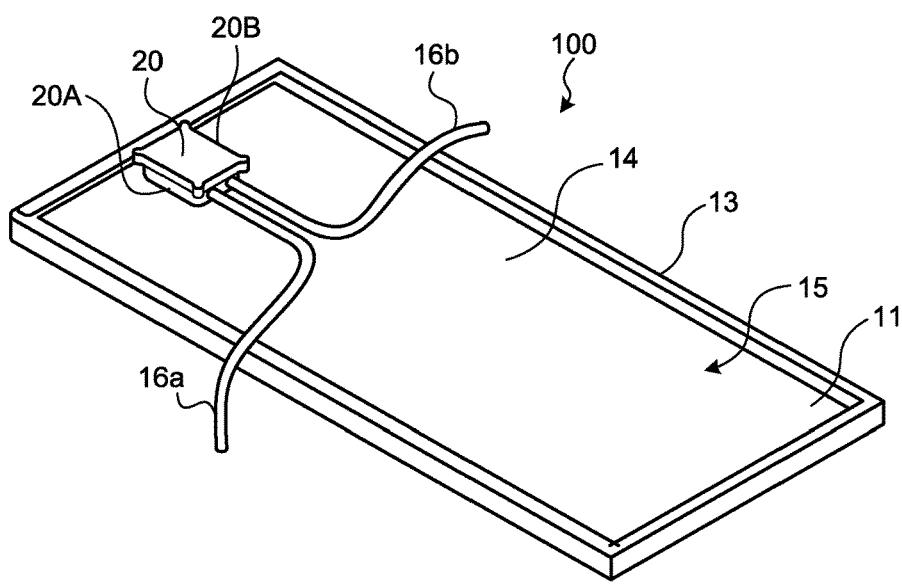
FIG. 2 is a perspective view of a back surface side of the solar cell module according to the embodiment.

FIG. 1 is a perspective view of a light-receiving surface side of a solar cell module according to an embodiment of the present invention. FIG. 2 is a perspective view of a back surface side of the solar cell module according to the embodiment. A solar cell module 100 includes a solar cell panel 11 and a support frame 13 attached to the solar cell panel 11 so as to cover the periphery of the solar cell panel 11. The solar cell panel 11 has a solar cell array 15 and a terminal box 20 for the solar cell module. The solar cell array 15 includes a plurality of solar cell strings connected to each other through horizontal tabs 19. Each solar cell string is made of a plurality of solar cells 12 connected in series through cell tabs 18. The plural connected solar cell strings are arrayed on a translucent front cover member 17 with resin filling materials sandwiching front and back surfaces of the plural connected solar cell strings. The solar cell strings have their back surface sides covered with a back cover member 14. The terminal box 20 is attached to the back cover member 14 to provide an output unit of the solar cell module 100. The support frame 13 can be made from aluminum.

The terminal box 20 is made of a resin material such as plastic and has a box shape forming an outer envelope. The terminal box 20 includes a box body 20A in a cuboid box shape that is open on one side thereof, and a plate-like cover 20B. The cover 20B closes the open side of the box body 20A. The output unit of the solar cell module 100 is housed within the box body 20A. Module coupling cables 16a and 16b extending to the outside are connected to the output unit of the solar cell module 100 for a purpose of taking out an output of the solar cell module 100 and a purpose of connection to other solar cell modules.

Figure 3:
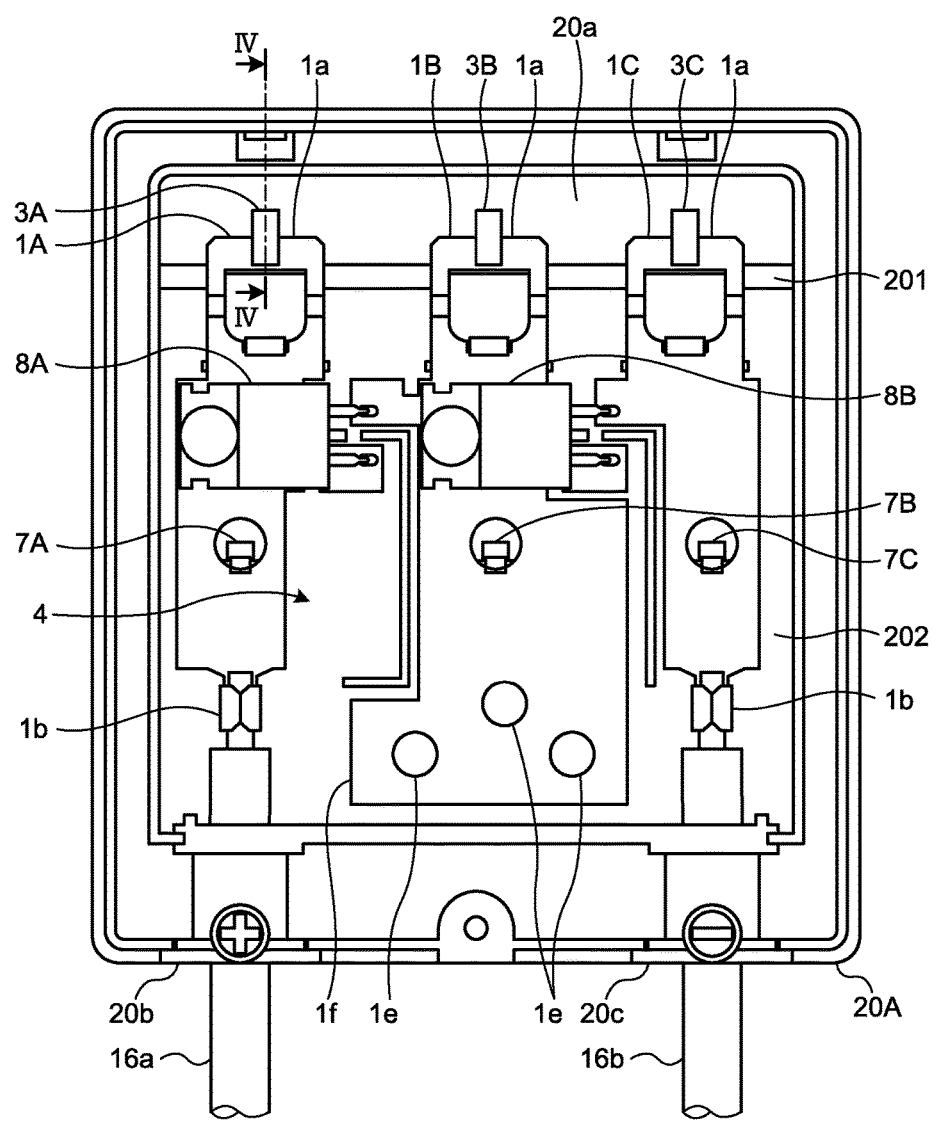
FIG. 3 is a front view of a terminal box of the solar cell module according to the embodiment with a cover removed.
Figure 4:
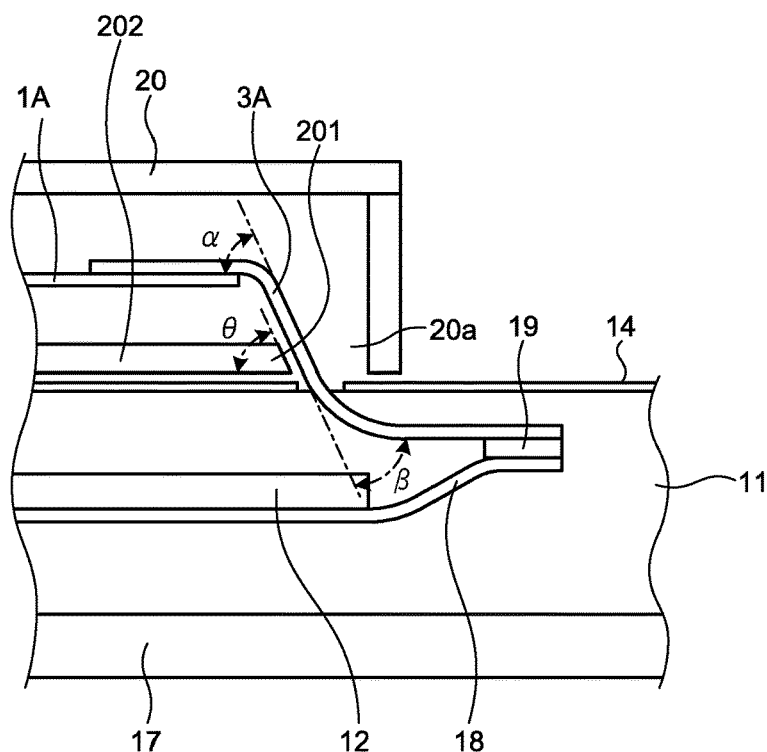
FIG. 4 is a sectional view of the solar cell module according to the embodiment.

FIG. 3 is a front view of the terminal box of the solar cell module according to the embodiment with the cover removed. FIG. 4 is a sectional view of the solar cell module according to the embodiment. FIG. 4 schematically illustrates a cross-section taken along line IV-IV in FIG. 3. While FIG. 4 illustrates the cross-section along line IV-IV on a terminal plate 1A, sectional structures along lines on a terminal plate 1B and a terminal plate 1C are identical. The box body 20A is in the cuboid box shape and has a bottom surface portion 202 and side surfaces that enclose four sides of the bottom surface portion 202. The box body 20A houses therein the output unit of the solar cell module 100. The bottom surface portion 202 of the box body 20A has a rectangular lead-wire lead-in port 20a at the corner of the upper side in the sheet of FIG. 3, and the port 20a is open along the side. Output lead wires 3A, 3B, 3C extending from within the solar cell panel 11 are inserted into the box body 20A through the lead-wire lead-in port 20a. Specifically, the output lead wires 3A, 3B, 3C are rectangular copper wires having solder-plated surfaces. Cable lead-out holes 20b and 20c for leading out the module coupling cables 16a and 16b are formed on a side surface of the box body 20A on the opposite side from the lead-wire lead-in port 20a.

The output unit of the solar cell module 100 is configured to include the three terminal plates 1A, 1B, 1C to which external wires are to be connected, and two bypass diodes 8A, 8B for bypassing non-power-generating cells. Protrusions 7A, 7B, 7C are provided protruding from the bottom surface portion 202 of the box body 20A. The three terminal plates 1A, 1B, 1C are made of a highly electrical-conductive metal, or a highly thermal-conductive material plated with a highly electrical-conductive metal. The terminal plates 1A, 1B, 1C are perforated to have their respective mounting holes through which the protrusions 7A, 7B, 7C are inserted, so that the terminal plates 1A, 1B, 1C are secured to the protrusions 7A, 7B, 7C and are supported with a gap between the bottom surface portion 202 of the box body 20A and the respective terminal plates 1A, 1B, 1C. The terminal plates 1A, 1B, 1C are disposed in parallel and arranged side by side in a right-left direction in the sheet of FIG. 3. Each of the terminal plates 1A, 1B, 1C has an elongated shape extending in an up-and-down direction of this Figure. The terminal plates 1A, 1B, 1C have lead-wire connection portions 1a at upper ends thereof in the sheet of FIG. 3. The output lead wires 3A, 3B, 3C, which are inserted through the lead-wire lead-in port 20a, are soldered to the lead-wire connection portions 1a. Output lead wires extending from one ends of the solar cells 12 connected in series are joined to the lead-wire connection portions 1a, respectively.

Of the three terminal plates 1A, 1B, 1C, the two terminal plates 1A and 1C located at right and left ends of FIG. 3 have cable connection portions 1b at lower ends thereof in the sheet of FIG. 3. The module coupling cables 16a, 16b are joined to the cable connection portions 1b by crimping. The terminal plate 1B has no cable connection portion 1b at a lower end thereof in the sheet of FIG. 3. To provide a heat releasing property, the lower end of the terminal plate 1B in the sheet of FIG. 3 has its width and length that are enlarged to provide a large area portion 1f having a larger area than the other terminal plates 1A and 1C. The large area portion 1f is perforated to have three circulation holes 1e. In the embodiment, a circulation hole 1e on the terminal plate 1A is hidden behind the bypass diode 8A and thus does not appear in the sheet of FIG. 3. When the terminal plates 1A, 1B, 1C are formed by press working, the outer shapes and the circulation holes 1e can be formed at the same time.

The box body 20A has an output unit 4 filled with a potting material that is a thermal-conductive insulating resin for the purpose of waterproofing. After the wiring and the provision of the output unit 4 are completed and the output unit 4 is attached to the solar cell module 100, the potting material in a molten state is poured into and fills up gaps between the respective components, and then cures. At that time, the potting material seals upper and lower surfaces of the terminal plates 1A, 1B, 1C. When the molten potting material is poured, the potting material circulates through the circulation holes 1e.

Each of the bypass diodes 8A, 8B includes an element body and leg electrodes extending from the element body. The element body has a semiconductor element sealed with an insulating resin material. The element body is in a flattened shape, and has one main surface on which a heat sink is exposed to improve a heat releasing property. The bypass diodes 8A, 8B are mounted on the terminal plates 1A, 1B with respective ones of the main surfaces of the element bodies held in contact with the surfaces of the terminal plates 1A and 1B.

Each of the bypass diodes 8A, 8B has a rectification function based on a PN junction. One of the two leg electrodes is the N pole and the other one is the P pole. The bypass diodes 8A, 8B bridge a space between the terminal plates, using the two leg electrodes. That is, each of the bypass diodes 8A, 8B has the element body supported by one of the adjacent two terminal plates, one of the leg electrodes connected to the terminal plate, and the other leg electrode extending toward the other terminal plate, such that each bypass diode bridges the space between these terminal plates. The bypass diode 8A, which bridges the space between the terminal plate 1A and the terminal plate 1B, bypasses a non-power-generating cell, if any, to prevent a current from flowing into the non-power-generating cell. The bypass diode 8B, which bridges the space between the terminal plate 1B and the terminal plate 1C, bypasses a non-power-generating cell, if any, to prevent a current from flowing into the non-power-generating cell.

The bypass diodes 8A, 8B, particularly, the element bodies are heat-generation sources that generate heat. The module coupling cables 16a and 16b, which include metallic wires, have a function of releasing heat although the amount of released heat is not large. The element body of the bypass diode 8A is mounted on the terminal plate 1A and the module coupling cable 16a is connected to the terminal plate 1A. The element body of the bypass diode 8B is mounted on the terminal plate 1B and no module coupling cable is connected to the terminal plate 1B. No bypass diode is mounted on the terminal plate 1C and the module coupling cable 16b is connected to the terminal plate 1C. That is, the terminal plate 1B is in the toughest environment in terms of the heat release. In the embodiment, the large area portion 1f having the larger area than other terminal plates 1A, 1C is provided on the opposite side of the terminal plate 1B from the lead-wire connection portion 1a to thereby improve the heat releasing property.

As described above, the terminal box 20 of the embodiment includes the highly thermal-conductive three terminal plates 1A, 1B, 1C, the bypass diodes 8A, 8B, and the potting material. The terminal plates 1A, 1B, 1C are provided together in the box body 20A and connected to the output lead wires extending from the solar cell module 100. The bypass diodes 8A, 8B are provided for bypassing non-power-generating cells, and are mounted on the terminal plates 1A and 1B to bridge the spaces between the terminal plates 1A, 1B, 1C. The potting material fills the inside of the box body 20A. Furthermore, the terminal plates 1A, 1B, 1C are supported by the protrusions 7A, 7B, 7C rising from the bottom surface portion 202 of the box body 20A with the gap formed between the bottom surface portion 202 and the respective terminal plates, and have the upper and lower surfaces sealed with the potting material. The circulation holes 1e are formed on the terminal plate 1B. When the potting material fills the inside of the box body 20A, the potting material in the molten state circulates through the circulation holes 1e to satisfactorily flow around within the box body 20A including the back surface of the terminal plate 1B, without leaving air space, so that the inside of the box body 20A is appropriately cooled and the performance is improved.

The terminal box 20 has an inclined portion 201 formed at an edge of the lead-wire lead-in port 20a that leads the output lead wires 3A, 3B, 3C into the terminal box 20. The inclined portion 201 is in a shape corresponding to an aimed angle of the output lead wires 3A, 3B, 3C. The output lead wires 3A, 3B, 3C are drawn out in parallel to and inside the back cover member 14 of the solar cell array 15 having the arrayed solar cells 12. The output lead wires 3A, 3B, 3C are then bent along the inclined portion 201 of the terminal box 20 such that the output lead wires 3A, 3B, 3C are introduced from the solar cell array 15 into the terminal box 20. The output lead wires 3A, 3B, 3C are subsequently further bent to be parallel to the terminal plates 1A, 1B, 1C in the terminal box 20, and are soldered to the terminal plates 1A, 1B, 1C.

Since the solar cell module 100 is configured to have the back cover member 14 and the terminal plates 1A, 1B, 1C disposed in parallel to each other, the output lead wires 3A, 3B, 3C in the solar cell array 15 need to be bent at two positions near a boundary between the solar cell array 15 and the terminal box 20 and near the terminal plates 1A, 1B, 1C in order to solder the output lead wires 3A, 3B, 3C to the terminal plates 1A, 1B, 1C. That is, the output lead wires 3A, 3B, 3C need to be bent both between the part connected to the horizontal tab 19 and the part led into the terminal box 20 through the lead-wire lead-in port 20a, and between the part led into the terminal box 20 through the lead-wire lead-in port 20a and the part connected to the terminal plates 1A, 1B, 1C.

An angle defined between the bottom surface portion 202 of the terminal box 20 and the inclined portion 201, in other words, an angle θ of the inclined portion 201 is preferably equal to or more than 30 degrees and less than 60 degrees. The angle θ of the inclined portion 201 is most preferably 45 degrees. When the angle θ of the inclined portion 201 is set less than 60 degrees, a bend angle β of the output lead wires 3A, 3B, 3C near the boundary between the solar cell array 15 and the terminal box 20 is so small as to reduce the stress concentration. Accordingly, a risk of wire breaking near the boundary between the solar cell array 15 and the terminal box 20 can be suppressed. Furthermore, due to the angle θ less than 60 degrees, a bend angle α near the terminal plates 1A, 1B, 1C is so small as to reduce the stress concentration, which can suppress a risk of wire breaking near the terminal plates 1A, 1B, 1C. The angle θ of the inclined portion 201, which is equal to or more than 30 degrees, can suppress an increase of the terminal box 20 in the length. If the angle θ of the inclined portion 201 is less than 30 degrees, the bottom surface portion 202 of the terminal box 20 is reduced in strength at the inclined portion 201 and thus is easy to break. However, when the angle θ of the inclined portion 201 is equal to or more than 30 degrees, a reduction in the strength of the bottom surface portion 202 of the terminal box 20 can be suppressed.

It is desirable that the terminal plates 1A, 1B, and 1C are provided in such a manner that the distal ends of the terminal plates 1A, 1B, 1C are located on an extension line obtained by extending the inclined portion 201 in a direction away from the solar cell panel 11. Providing the terminal plates 1A, 1B, 1C such that the distal ends of the terminal plates 1A, 1B, and 1C are located on the extension line of the inclined portion 201 facilitates the operation of soldering the output lead wires 3A, 3B, 3C to the terminal plates 1A, 1B, 1C.

Figure 5:
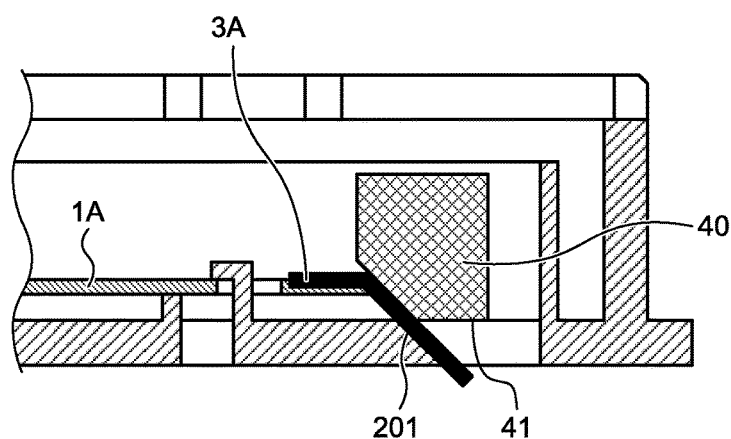
FIG. 5 is a sectional view of the terminal box during assembly of the solar cell module according to the embodiment.

FIG. 5 is a sectional view of the terminal box during assembly of the solar cell module according to the embodiment. FIG. 5 illustrates a cross-section of the solar cell module according to the embodiment corresponding to the cross-section taken along line IV-IV in FIG. 3. While FIG. 5 illustrates the cross-section along line IV-IV on the terminal plate 1A, the sectional structures taken along lines on the terminal plate 1B and the terminal plate 1C are identical. During the assembly of the solar cell module 100, as illustrated in FIG. 5, a jig 40 for preventing the uplifting of the output lead wires 3A, 3B, 3C is used to apply a force to the output lead wires 3A, 3B, 3C from above to clamp the output lead wires 3A, 3B, 3C against the inclined portion 201. In this state, the output lead wires 3A, 3B, 3C are soldered to the terminal plates 1A, 1B, 1C. This can prevent the uplifting of the output lead wires 3A, 3B, 3C, facilitate the operation of soldering the output lead wires 3A, 3B, 3C to the terminal plates 1A, 1B, 1C, and enhance the electrical reliability. Furthermore, due to an inclined surface 41 at an end of the jig 40, the shape and angle of the output lead wires 3A, 3B, 3C can be maintained in an aimed condition, and the risk of breakage of the output lead wires 3A, 3B, 3C caused by temperature expansion and contraction of the potting material can be suppressed.

As described above, the solar cell module 100 according to the embodiment can maintain a rising angle of the output lead wires 3A, 3B, 3C in an aimed condition by using the inclined portion 201 of the terminal box 20, and can suppress the risk of breakage of the output lead wires 3A, 3B, 3C cause by temperature expansion and contraction of the potting material.

The configurations described in the above embodiment are only examples of the content of the present invention. The configurations can be combined with other well-known techniques, and a part of each configuration can be omitted or modified without departing from the scope of the present invention.

REFERENCE SIGNS LIST 1A, 1B, 1C terminal plate, 1*a* lead-wire connection portion, 1*b* cable connection portion, 1*e* circulation hole, 1*f* large area portion, 3A, 3B, 3C output lead wire, 4 output unit, 7A, 7B, 7C protrusion, 8A, 8B bypass diode, 11 solar cell panel, 12 solar cell, support frame, 14 back cover member, 15 solar cell array, 16*a*, 16*b* module coupling cable, 17 front cover member, 18 cell tab, 19 horizontal tab, 20 terminal box, 20*a* lead-wire lead-in port, 20*b*, 20*c* cable lead-out hole, 20A box body, 20B cover, 40 jig, 41 inclined surface, 100 solar cell module, 201 inclined portion, 202 bottom surface portion.

The invention claimed is:

1. A solar cell module comprising a solar cell panel, an output lead wire led from the solar cell panel, a module coupling cable to transmit an electrical output of the solar cell panel to an outside, a terminal box, and a terminal plate, the output lead wire and the module coupling cable being connected to the terminal plate in the terminal box, wherein
the terminal box has a lead-wire lead-in port through which the output lead wire is led into the terminal box, the terminal box having an inclined portion formed at an edge of the lead-wire lead-in port, the inclined portion having an inclination relative to a bottom surface portion of the terminal box
the output led wire has a bent portion bent at an angle for connection to the terminal plate, and the inclined portion of the terminal box is in a shape corresponding to the angle of the bent portion of the output lead wire, and
the output lead wire is led into the terminal box with the bent portion extending along the inclined portion.

2. The solar cell module according to claim 1, wherein an angle defined between the bottom surface portion of the terminal box and the inclined portion is equal to or more than 30 degrees and less than 60 degrees.

3. The solar cell module according to claim 1, wherein the terminal plate has an end disposed on an extension line obtained by extending the inclined portion in a direction away from the solar cell panel.

4. A solar cell module manufacturing method of manufacturing the solar cell module according to claim 1, the method comprising soldering the output lead wire to the terminal plate with a jig clamping the output lead wire against the inclined portion.

* * * * *